Figure 1:
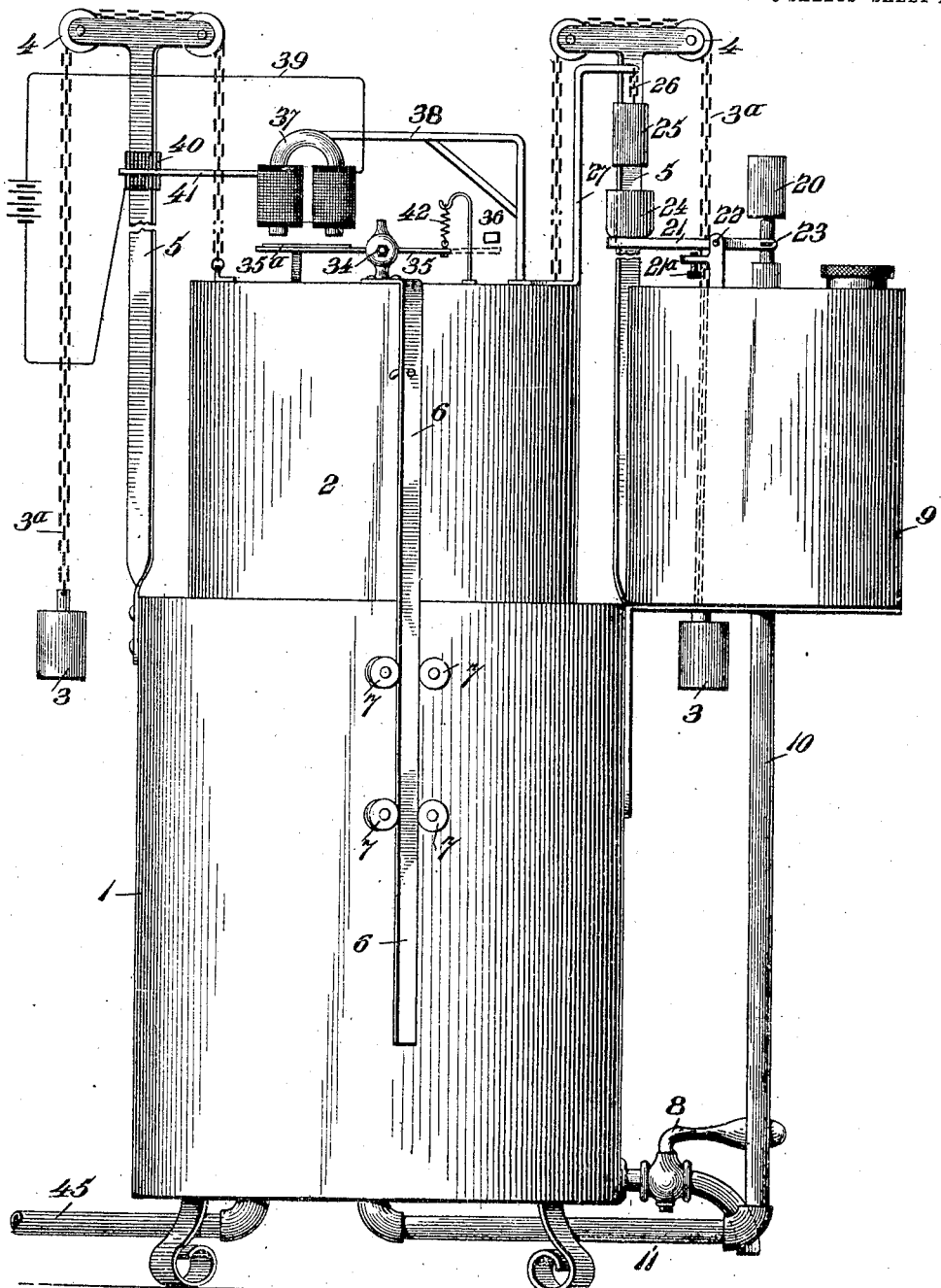

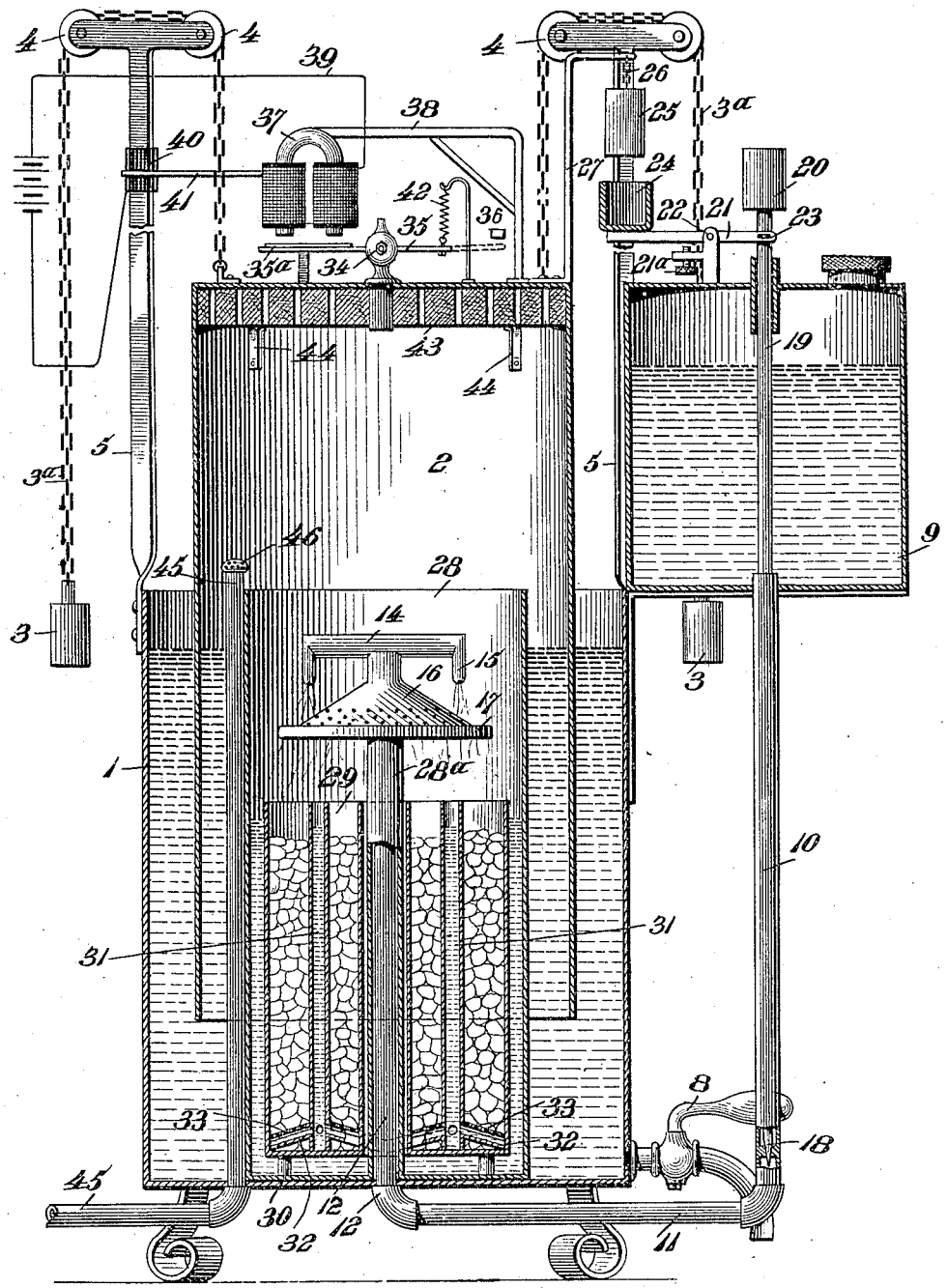

No. 844,609. PATENTED FEB. 19, 1907.
S. M. MEYER.
ACETYLENE GAS GENERATOR.
APPLICATION FILED JUNE 30, 1905.
3 SHEETS—SHEET 3.
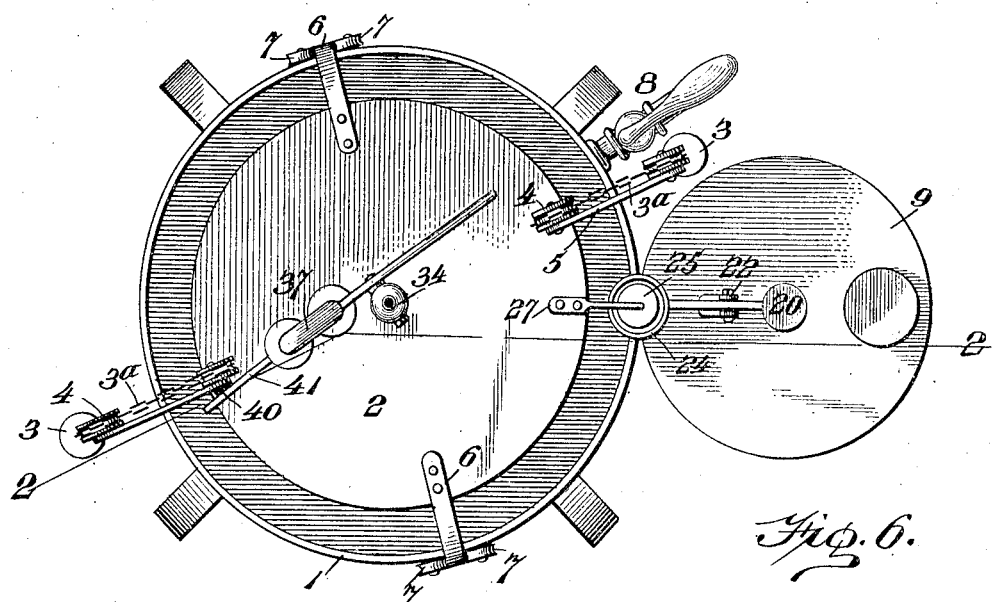
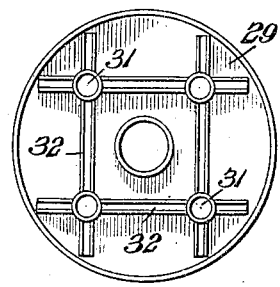
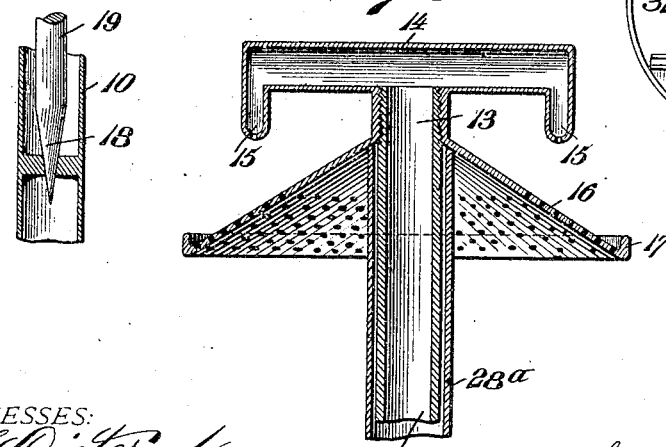
WITNESSES:
H. S. Dieterich
N. P. Hammond
INVENTOR
Svend Martin Meyer
BY Knight Bros
Attorneys

UNITED STATES PATENT OFFICE.

SVEND MARTIN MEYER, OF NEW YORK, N. Y., ASSIGNOR TO GEORGE CLINTON BATCHELLER, OF NEW YORK, N. Y.

ACETYLENE-GAS GENERATOR.

No. 844,609.        Specification of Letters Patent.        Patented Feb. 19, 1907.

Application filed June 30, 1905. Serial No. 267,793.

*To all whom it may concern:*

Be it known that I, SVEND MARTIN MEYER, a citizen of the United States, and a resident of the borough of Brooklyn, in the city and State of New York, have invented certain new and useful Improvements in Acetylene-Generators, of which the following is a specification.

The subject of my invention is an acetylene-generator system adapted to supply a larger or smaller number of lights and to automatically regulate the generation of gas according to the number and capacity of burners in use at any time. To this end I employ an automatically-reciprocating gas-holder which is alternately filled and depleted, so as to maintain a uniform pressure and constant supply of gas to the burners, while the generation of gas is effected intermittently in pulsations automatically regulated in frequency according to the amount consumed.

The invention further relates to means by which a requisite and regulated quantity of water is supplied to the carbid at each complete movement of the gas-holder and sufficient water-supply maintained to continue generation during the ascent of the holder.

The invention further relates to means for effecting distribution of water to the carbid, means for carrying off heat from the carbid, means for taking up water in suspension in the gas, and means for facilitating the removal of lime and spent matter and recharging with fresh carbid.

In the accompanying drawings, Figure 1 is a front elevation of an apparatus illustrating the invention. Fig. 2 is a vertical section of the same. Fig. 3 is a plan view thereof. Fig. 4 is a vertical section of the removable sprinkling apparatus on a larger scale. Fig. 5 is a detail section of the water-supply valve. Fig. 6 is a plan view of the carbid-pan and water-distributing troughs therein detached from the rest of the apparatus.

1 indicates a water-tank, and 2 a customary gas-holder bell rising and falling therein, being suspended by counterweights 3, and chains $3^a$, running over sheaves 4, mounted on standards 5, fixed to the tank, said bell being guided in customary manner by bars 6, depending from its top and running between guide-sheaves 7, mounted on the outside of the tank. At bottom of the tank 1 is a cock 8 for drawing off dirty water.

9 represents an elevated tank for the water-supply for generating gas. The water-supply pipe consists of a vertical section 10, descending from the bottom of the tank 9, a horizontal section 11, extending therefrom to the center of the tank 1, and a vertical section 12, extending upward in the center of the tank 1 and having a removable sprinkler mounted by a screw-thread 13 on its upper end, consisting of a hollow T-head 14, terminating in downwardly-projecting jet-nozzles 15, and a perforated distributing hood 16, having an upturned margin 17 to form a trough to prevent the flow of water from the margin of the hood. Near the bottom of the first pipe-section 10 is a needle-valve 18, (shown in detail in Fig. 5,) the rod 19 of which extends upward through and above the top of the water-supply tank and carries a weight 20 to hold the valve to its seat. This valve-rod is lifted at each descent of the bell 2 by means of a lever 21, fulcrumed at 22, and having a slot-and-pivot connection 23 with the valve-rod.

On the free end of the lever 21 is a cup 24 for the reception of a weight 25, suspended by a chain 26 from a standard 27, mounted on top of the bell, so that when the bell approaches its lowest position the weight being imposed on the free end of the lever 21 will depress it, and thereby lift the valve 18 from its seat and permit the passage of water until by the rising of the bell the free end of the lever 21 is released and the water again cut off. A set-screw $21^a$ to determine and limit the descent of the lever 21 accurately regulates the extent to which the valve 18 is opened at each stroke.

Within the main tank 1 is an annular inner tank 28, the outer wall of which is the same height as the tank 1, while its inner cylindrical wall forms a tube $28^a$, surrounding the vertical water-pipe 10 and terminating beneath the hood 16, as shown in Figs. 2 and 4.

The carbid-pan 29 is of annular form and fits loosely within the inner tank 28, surrounding the central tube $28^a$ thereof. A considerable space is left between the carbid-pan 29 and the surrounding wall of the inner tank 28, and this space is filled with water, as shown, to keep the carbid cool. For the same purpose the carbid-pan is provided with feet 30, resting on the bottom of the inner tank 28 and leaving space for water between the pan-bottom and that of the tank.

The carbid-pan 29 is furnished with four (more or less) bottomless vertical pipes 31, open at top, resting on the bottom of the pan and communicating near their lower ends with radial distributing-troughs 32, inclined downward and outward, and serving to distribute to all parts of the under surface of the carbid in the pan water descending through the pipes 31. The troughs 32 are covered with perforated diaphragms 33 to prevent their becoming choked or obstructed with carbid or lime therefrom.

In top of the bell 2 is an outlet-valve 34 for the escape of air to permit the filling of the bell with gas. This is also useful as a safety-valve to discharge gas and relieve excessive pressure when from leakage in the water cut-off or other cause the evolution of gas may exceed the consumption. For this purpose the said valve may be opened automatically when the bell reaches a predetermined height by the contact of its operating-lever 35 with a suitable tappet 36, as indicated in dotted lines in Fig. 2, or it may be operated by the electromagnetic attachment shown.

37 represents an electromagnet carried on the top of the bell 2 by a bracket 38 or other suitable support and whose coil is connected by flexible wires 39 with a suitable source of electricity through the medium of a circuit-closing device 40, with which a conducting spring-rod 41 makes contact when the bell 2 reaches its highest position. The magnet being thus excited attracts the armature 35ᵃ on lever 35, and thereby opens the valve. When pressure is thus relieved, the bell 2 descends by gravity, and the valve is closed by a spring 42.

43 represents a mat of absorbent fibrous material, preferably perforated, as shown, to afford a greater extent of exposed surface, which is secured within the top of the bell by suitable means—as, for example, spring-catches 44—in order to take up and retain water carried in suspension by the gas. This obviates the difficulty which would otherwise occur from water condensing beneath the top of the bell and dripping from the central part thereof within the carbid-pan, and thus prolonging the evolution of gas after it is desired to stop the same by cutting off the water-supply through the valve 18.

45 indicates the pipe through which gas is delivered for consumption. This is covered by a removable perforated or reticulated cap 46.

Operation: The above-described apparatus maintains a constant supply of gas with substantially uniform pressure, whether one or any larger number of burners are in use. When the bell 2 reaches its lowest position, the valve 18 is automatically opened and a modicum of water passed until gas is generated to develop pressure to overcome the weight of the bell. The bell then gradually rises until the pressure balances its weight, and the valve having closed automatically the pressure and supply are maintained by the weight and descent of the bell, and the supply of gas is thus uniformly maintained according to its consumption. If many burners are in use, the bell is more frequently charged, and vice versa. Water rising through the pipe 12 is distributed over the upper surface of the carbid by the jet-nozzles 15 and perforated hood 16 and also fills the pipes 31, from which fresh water is carried by the radial troughs 32 and perforated diaphragms 33 over the under surface of the carbid. In practice a larger proportion of the water passes through those perforations in the hood which are directly reached by the diffused spray from the respective jets 15, and these being approximately over the open top of tubes 31 a sufficient proportion of the water will be conveyed and distributed to the bottom of the carbid mass. In practice sufficient pressure is not normally developed in the gas-holder to open the automatic discharge-valve 34. This is designed for emergency and can be connected with a suitable discharge-flue to carry off escaping gas. In the normal operation of the apparatus the generation of gas almost ceases when all the burners are closed, for the reason that the supply-valve 18 is opened only by the descent of the bell 2. After the water-supply valve is closed the pipes 31 afford a head of water to continue the generation of gas for a limited period after the closure of the valve, so that a constant supply is kept up so long as any burners are in use.

The cleaning out and refilling of the carbid-pan are readily effected by screwing off the T-head 14 and distributing-hood 16 and removing the pan 29.

Having thus described my invention, the following is what I claim as new therein and desire to secure by Letters Patent:

1. In an acetylene-generator, the combination of an annular carbid-pan, a water-supply pipe rising vertically therein and a spreader at top of said pipe consisting of a T-head with jet-nozzles and a perforated hood on which the water falls, for distributing water over the top of the pan, substantially as described.

2. In an acetylene-generator, the combination of an annular carbid-pan, an annular series of vertical water-pipes arranged therein and radial troughs connected with the lower ends of said water-pipes for distributing water therefrom to the carbid in the pan, substantially as described.

3. In an acetylene-generator, the combination of a main water-tank 1 a removable inner water-tank 28 of annular form having a central vertical tube 28$^a$ and a tight annular bottom uniting said central tube with the outer wall of the inner tank; a removable annular carbid-receptacle 29 surrounding the vertical tube 28$^a$ and supported by feet 30 within the inner water-tank, so as to be exposed around and below to water in said inner tank, a water-supply pipe 12 extending upward within the central tube of the inner water-tank, and a distributing device on top of said water-supply pipe, substantially as described.

4. In an acetylene-generator, the combination of a water-tank, a gas-holding bell moving vertically therein, a carbid-receptacle inclosed in said water-tank and gas-holding bell, an elevated water-supply tank, a pipe conveying water therefrom, means distributing water from said pipe to the carbid in the receptacle, a valve in said pipe controlling the passage of water therethrough, a lever-and-rod connection for opening and closing said valve, and a weight suspended by a flexible attachment from a bracket carried by the gas-holding bell and a cup-like receptacle on the valve-lever, by which the weight is received so as to open the valve before the bell reaches the limit of its descent.

5. A regulating water-supply apparatus for an acetylene-generator comprising an elevated water-supply tank 9, a delivery-pipe 10 therefrom, a valve 18 in said pipe, a valve-rod 19, a weight 20 tending to hold the valve to its seat, a lever 21 for lifting said valve-rod and valve, a movable weight 25 for actuating said lever, a gas-holder bell 2, a suitable bracket or attachment 27 carried thereby and a flexible connection 26 suspending the weight from the bell attachment 27 whereby relative vertical movement is permitted between the suspended weight 25 and the gas-holder bell and the valve is lifted before the bell reaches the limit of its descent, substantially as described.

6. The combination of an annular carbid-receptacle, a water-supply pipe extending upward within said receptacle, a sprinkling device at top of said supply-pipe distributing water over the top of the carbid-receptacle and a series of vertical pipes within the receptacle conveying a portion of the water directly to the carbid at bottom of said receptacle, substantially as set forth.

7. In an acetylene-generator, the combination of an annular carbid-receptacle, a water-delivery pipe rising within the same, a horizontal sprinkling-nozzle at top of said delivery-pipe, an inclined perforated distributing-hood beneath the sprinkling-nozzle and a series of vertical pipes within the carbid-receptacle, open at top, serving to convey a portion of the water delivered through the sprinkling-nozzle direct to the bottom of the said receptacle, substantially as described.

8. In an acetylene-generator, the combination of a water-tank, a gas-holder bell moving vertically therein, an inner water-tank of annular form having a central annular tube and contained in the first-named water-tank, an annular carbid-receptacle surrounding the central vertical tube of the annular water-tank and supported above the bottom thereof, so as to be exposed to contact with water contained in said tank, a water-delivery pipe extending upward within the central tube of the annular water-tank and means at top of said pipe for distributing water over the top of the carbid-receptacle.

9. In an acetylene-generating apparatus, the combination of a carbid-receptacle, a water-tank and vertically-moving gas-holder bell inclosing said receptacle, an elevated water-supply tank, a water-conducting pipe therefrom, means for distributing water from the conducting-pipe to the carbid in the receptacle, a valve in the lower part of the conducting-pipe regulating the flow of water therethrough, a vertical rod on which said valve is mounted, a weight on said rod, tending to close said valve, a horizontal lever connected with the valve-rod for lifting it, a weight suspended from an attachment to the gas-holder bell engaging with the valve-lever so as to raise the valve when the bell approaches the end of its downward movement and a set-screw with which the valve-lever contacts so as to vary the extent of movement imparted to the valve at each stroke.

Signed at New York this 28th day of June, 1905.

SVEND MARTIN MEYER.

Witnesses:
OCTAVIUS KNIGHT,
WILLIAM P. HAMMOND.